(12) United States Patent
Cheon et al.

(10) Patent No.: US 10,454,282 B2
(45) Date of Patent: Oct. 22, 2019

(54) BATTERY PACK

(71) Applicant: SAMSUNG SDI CO., LTD., Yongin-si, Gyeonggi-do (KR)

(72) Inventors: Moonsoo Cheon, Yongin-si (KR); Seungil Kim, Yongin-si (KR); Gangya Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 118 days.

(21) Appl. No.: 15/433,418

(22) Filed: Feb. 15, 2017

(65) Prior Publication Data
US 2017/0264107 A1    Sep. 14, 2017

(30) Foreign Application Priority Data

Mar. 8, 2016 (KR) .................. 10-2016-0027696

(51) Int. Cl.
| | |
|---|---|
| *H02J 7/00* | (2006.01) |
| *H01M 10/48* | (2006.01) |
| *H01M 10/42* | (2006.01) |
| *H01M 2/10* | (2006.01) |
| *H01M 2/20* | (2006.01) |

(52) U.S. Cl.
CPC .......... *H02J 7/0013* (2013.01); *H01M 2/105* (2013.01); *H01M 2/204* (2013.01); *H01M 10/425* (2013.01); *H01M 10/482* (2013.01); *H01M 10/486* (2013.01); *H02J 7/007* (2013.01); *H02J 7/0068* (2013.01); *H01M 2220/30* (2013.01)

(58) Field of Classification Search
CPC ............. H01M 10/425; H01M 10/482; H01M 10/486; H01M 2220/30; H01M 2/105; H01M 2/204; H02J 7/0013; H02J 7/0068; H02J 7/007
See application file for complete search history.

(56) References Cited

U.S. PATENT DOCUMENTS

| | | | |
|---|---|---|---|
| 7,678,493 | B2 | 3/2010 | Morita et al. |
| 8,597,810 | B2 | 12/2013 | Yusa et al. |
| 2010/0178549 | A1 | 7/2010 | Moom |

(Continued)

FOREIGN PATENT DOCUMENTS

| | | |
|---|---|---|
| EP | 2421070 A1 | 2/2012 |
| JP | 2005-56721 A | 3/2005 |

(Continued)

OTHER PUBLICATIONS

KIPO Notice of Allowance dated Sep. 20, 2017, for corresponding Korean Patent Application No. 10-2016-0027696 (2 pages).

(Continued)

*Primary Examiner* — Lingwen R Zeng
(74) *Attorney, Agent, or Firm* — Lewis Roca Rothgerber Christie LLP

(57) ABSTRACT

A battery pack includes at least two battery cells; a circuit board to control charging and discharging operations of the battery cells; and a connection tab electrically connected to the battery cells, extending towards the circuit board, and including a bent portion proximal to the battery cells and located within a battery area defined by the battery cells. A battery pack suitable for a compact type device is provided and a low-resistive design may be applied to the battery pack.

11 Claims, 5 Drawing Sheets

(56) References Cited

U.S. PATENT DOCUMENTS

| | | | |
|---|---|---|---|
| 2011/0104519 A1* | 5/2011 | Ahn | H01M 2/1022 429/7 |
| 2011/0262777 A1 | 10/2011 | Choi et al. | |
| 2011/0308856 A1 | 12/2011 | Park | |
| 2013/0052487 A1 | 2/2013 | Park | |
| 2013/0136956 A1 | 5/2013 | Nakano et al. | |
| 2013/0330576 A1 | 12/2013 | Kolden et al. | |
| 2015/0222131 A1* | 8/2015 | Kano | H02J 7/0013 320/112 |

FOREIGN PATENT DOCUMENTS

| | | |
|---|---|---|
| JP | 2005-317460 A | 11/2005 |
| JP | 2007-66773 A | 3/2007 |
| JP | 2008-166208 A | 7/2008 |
| JP | 2008-287985 A | 11/2008 |
| JP | 2013-114779 A | 6/2013 |
| KR | 10-2010-0082530 | 7/2010 |
| KR | 10-2011-0103382 | 9/2011 |
| KR | 10-2011-0139083 | 12/2011 |
| KR | 10-1134400 | 4/2012 |
| KR | 10-1158810 | 6/2012 |
| KR | 10-2013-0024752 | 3/2013 |
| KR | 10-2013-0034596 | 4/2013 |
| WO | WO 2015/094035 A1 | 6/2015 |

OTHER PUBLICATIONS

KIPO Office Action dated Feb. 10, 2017, for corresponding Korean Patent Application No. 10-2016-0027696 (10 pages).

EPO Extended Search Report dated Jun. 6, 2017, for corresponding European Patent Application No. 17158670.4 (7 pages).

EPO Office Action dated Apr. 4, 2018, for corresponding European Patent Application No. 17158670.4 (5 pages).

\* cited by examiner

BATTERY PACK

CROSS-REFERENCE TO RELATED APPLICATION

This application claims priority to and the benefit of Korean Patent Application No. 10-2016-0027696, filed on Mar. 8, 2016 in the Korean Intellectual Property Office, the entire disclosure of which is incorporated herein by reference.

BACKGROUND

1. Field

Aspects of one or more embodiments relate to a battery pack.

2. Description of the Related Art

In general, a secondary battery is rechargeable and dischargeable, unlike a primary battery that is not rechargeable. A secondary battery is used as an energy source in mobile devices, electric vehicles, hybrid vehicles, electric bicycles, and uninterruptible power supplies, and may be used in the form of a single battery or a battery pack, in which a plurality of batteries are electrically connected as a single unit, according to kinds of external devices to which the secondary battery is applied.

A small-sized mobile device, such as a mobile phone, is operable with an output and a capacity of a single battery, but electric vehicles or hybrid vehicles consume a relatively large amount of electric power to drive for a long time at a high electric power output and, thus, use a pack type battery including a plurality of batteries. In addition, an output voltage or an output current may increase according to the number of batteries included in a module.

SUMMARY

According to an aspect of one or more embodiments, a battery pack is suitable for a compact type device by reducing a connection tab that mediates electric connection between a battery cell and a circuit board.

According to another aspect of one or more embodiments, a battery pack, to which a low-resistive design is applied, has a reduced signal transmission path.

According to another aspect of one or more embodiments, a battery pack has an improved support strength at a connection tab that mediates electric connection between a battery cell and a circuit board.

Additional aspects will be set forth, in part, in the description which follows and, in part, will be apparent from the description, or may be learned by practice of the presented embodiments.

According to one or more embodiments, a battery pack includes: at least two battery cells; a circuit board to control charging and discharging operations of the battery cells; and a connection tab electrically connected to the battery cells, extending towards the circuit board, and including a bent portion proximal to the battery cells and located within a battery area defined by the battery cells.

The connection tab may extend from a connection member electrically connecting neighboring battery cells of the at least two battery cells to each other, and the battery area may be a square area including a plurality of battery cell regions connected by the connection member.

The connection tab may include: a first portion extending in a first direction from a connection member electrically connecting neighboring battery cells of the at least two battery cells to each other; and a second portion extending in a length direction of the battery cells via the bent portion, wherein the length direction of the battery cells is different from the first direction.

The first portion of the connection tab may extend across a valley region between the neighboring battery cells.

The second portion of the connection tab may be located within a valley region between the neighboring battery cells.

The connection member may connect the neighboring battery cells in the first direction in parallel, and connect the neighboring battery cells in a second direction that is different from the first direction in series.

The connection tab may further include: a connection portion connected to the circuit board; and a lead portion extending between the second portion and the connection portion.

The connection tab may include a metal plate formed as an integral body.

The connection tab may include a metal plate that is integrally formed with the connection member.

The connection portion may be directly connected to the circuit board.

The circuit board may include a connection hole to which the connection portion is inserted.

The lead portion may extend diagonally with a slant inclination angle so as to concurrently follow the first direction and a second direction that is different from the first direction.

The circuit board may be located above the battery cells in the first direction.

The connection member may include: a first welding portion and a second welding portion with respect to the battery cells; and a cut portion crossing between the first welding portion and the second welding portion.

The battery pack may further include a cell holder configured to accommodate the battery cells, wherein an internal surface of the cell holder may surround the battery cells, and the circuit board is arranged above an external surface of the cell holder.

BRIEF DESCRIPTION OF THE DRAWINGS

These and/or other aspects will become apparent and more readily appreciated from the following description of one or more embodiments, taken in conjunction with the accompanying drawings, in which.

DETAILED DESCRIPTION

Hereinafter, a battery pack according to one or more embodiments will be described further below with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

Figure 1:
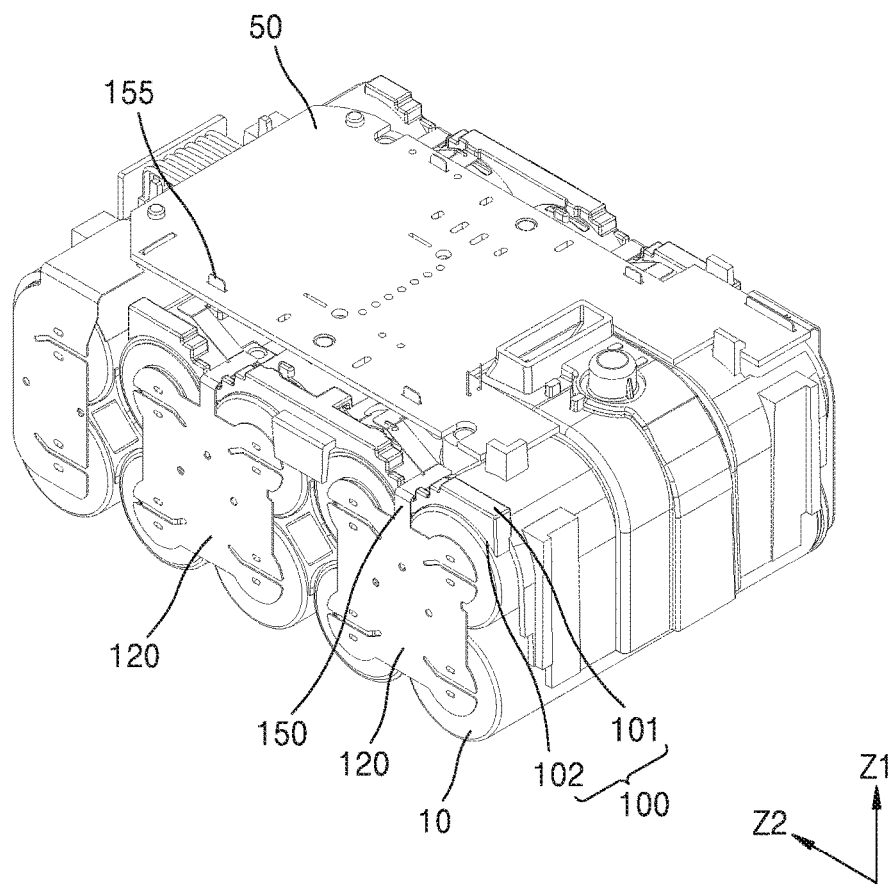
FIG. 1 is a perspective view of a battery pack according to an embodiment.
Figure 2:
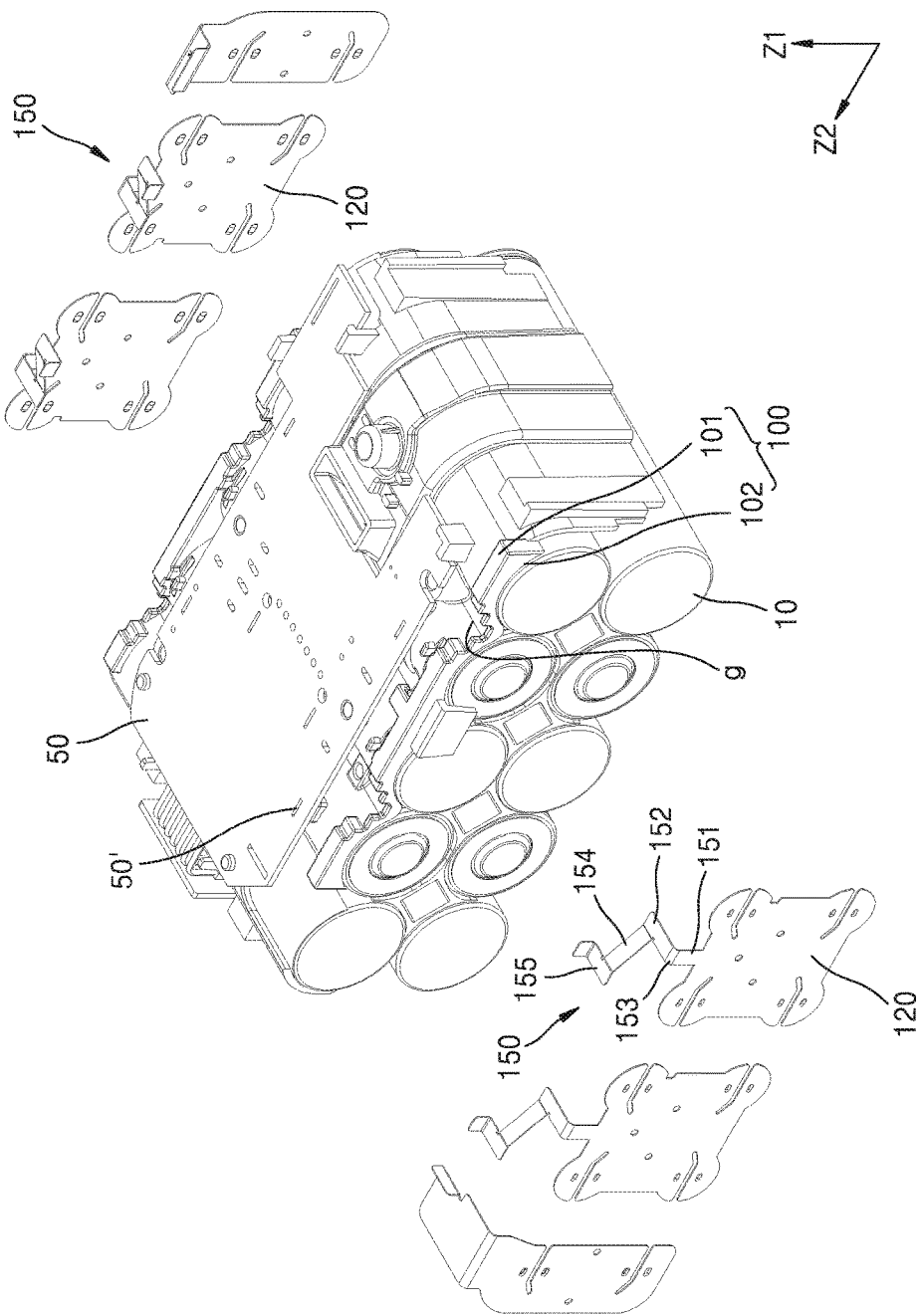
FIG. 2 is an exploded perspective view of the battery pack of FIG. 1.
Figure 3:
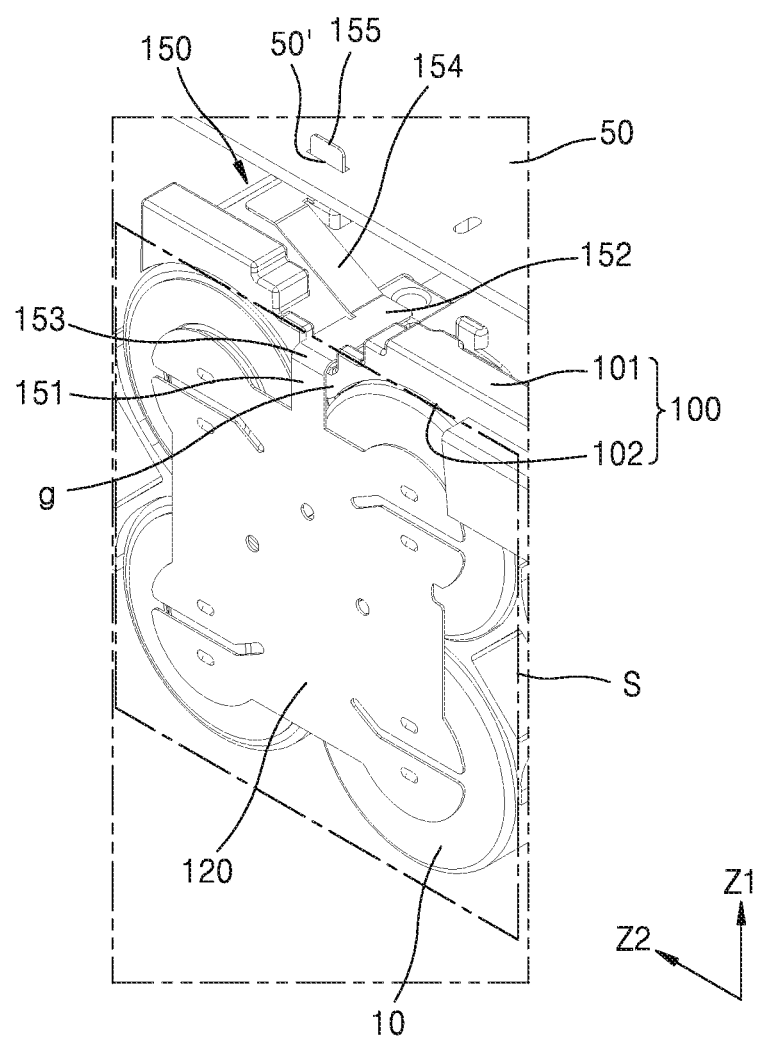
FIG. 3 is a perspective view of a region of the battery pack of FIG. 1.
Figure 4:
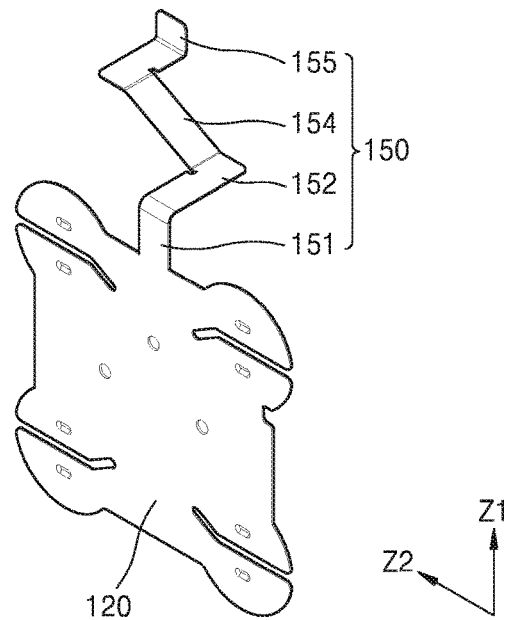
FIG. 4 is a perspective view of a connection tab of the battery pack of FIG. 1.
Figure 5:
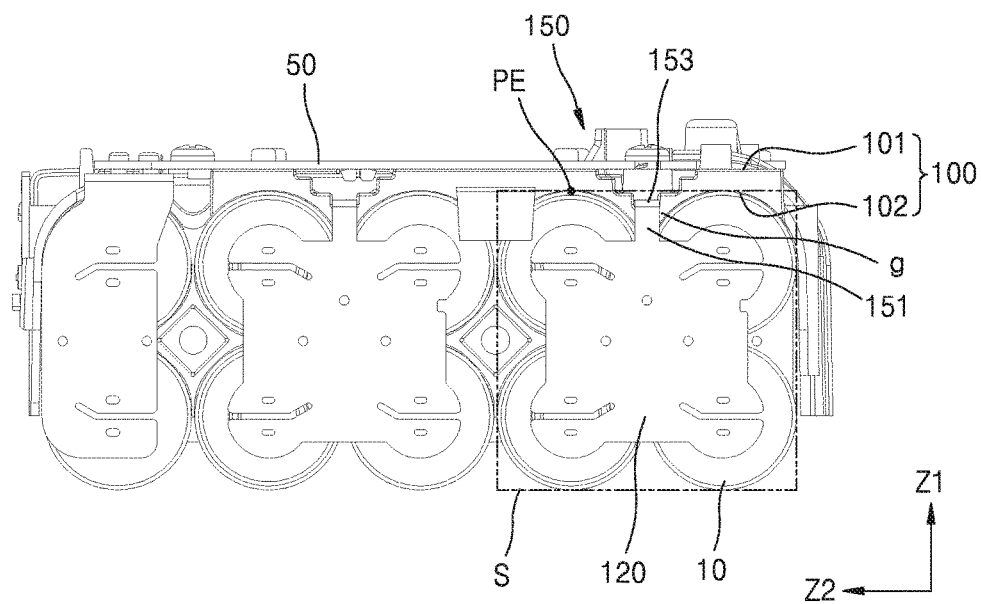
FIG. 5 is a side view of the battery pack of FIG. 1.
Figure 6:
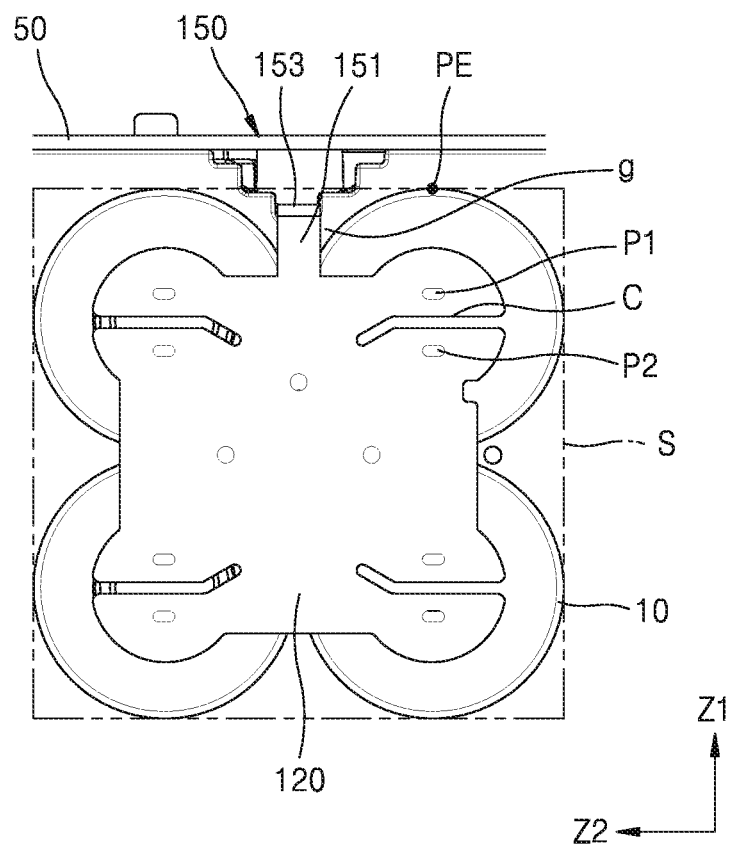
FIG. 6 is a side view of a region of the battery pack of FIG. 1.

FIG. 1 is a perspective view of a battery pack according to an embodiment, and FIG. 2 is an exploded perspective view of the battery pack of FIG. 1. FIG. 3 is a perspective view of a region of the battery pack of FIG. 1. FIG. 4 is a perspective view of a connection tab of the battery pack of FIG. 1. FIG. 5 is a side view of the battery pack of FIG. 1, and FIG. 6 is a side view of a region of the battery pack of FIG. 1.

Referring to the drawings, a battery pack according to an embodiment may include a plurality of battery cells 10, a cell holder 100 for accommodating the battery cells 10, and a circuit board 50 for controlling charging/discharging operations of the battery cells 10.

In an embodiment, the battery cell 10 may have different electrodes at opposite ends thereof in a length direction, and may be formed as a cylinder. A concave valley region "g" may be formed between neighboring battery cells 10, outer circumferential surfaces of which may be in contact with each other.

The plurality of battery cells 10 may include two or more battery cells 10. The plurality of battery cells 10 may be electrically connected to one another in a serial manner, a parallel manner, or a combined parallel-serial manner. The plurality of battery cells 10 may be electrically connected to one another via a connection member 120, e.g., the plurality of battery cells 10 may be connected in parallel by the connection member 120 that electrically connects the same polarities of the neighboring battery cells 10, or may be connected in series by the connection member 120 that electrically connects opposite polarities of the neighboring battery cells 10.

For example, a connection member 120 may electrically connect four battery cells 10 to one another, and the connection member 120 may connect the neighboring battery cells 10 in a first direction (e.g., a Z1-direction) in parallel while connecting the neighboring battery cells 10 in a second direction (e.g., a Z2-direction) in series. In an embodiment, the connection member 120 may connect the same polarities of the battery cells 10 that make a pair in the first direction (e.g., the Z1-direction) to connect the corresponding battery cells 10 in parallel, and may connect opposite polarities of the battery cells 10 that make a pair in the second direction (e.g., the Z2-direction) to connect the corresponding battery cells 10 in series.

By connecting the battery cells 10 in parallel in the first direction (e.g., the Z1-direction) and connecting the battery cells 10 in series in the second direction (e.g., the Z2-direction), a combined connection of the parallel-serial connections may be obtained. Accordingly, an output capacity of the battery pack may be increased or optimized to be high capacity and high output. In an embodiment, the battery cells 10 may be connected in parallel in the first direction (e.g., the Z1-direction) and may be connected in series in the second direction (e.g., the Z2-direction) by using one connection member 120, and, thus, the number of connection members 120 for connecting the neighboring battery cells 10 may be reduced.

The battery cells 10 may be accommodated in the cell holder 100. The cell holder 100 may provide an accommodation space having a shape matching or corresponding to that of the battery cells 10. For example, the cell holder 100 may include a plurality of cylindrical accommodation spaces that are arranged in the first and second directions (e.g., the Z1 and Z2-directions). The cell holder 100 has an internal surface 102 facing the battery cells 10 to surround the battery cells 10, and an external surface 101 to support the circuit board 50.

The cell holder 100 may have any of various shapes, provided that the accommodation space for the battery cells 10 is provided. For example, the cell holder 100 may be formed as one body or may be formed by combining different members. In an embodiment, for example, two different members arranged between the battery cells 10 and the circuit board 50 may be coupled to each other to form the cell holder 100. Here, the external surface 101 of the cell holder 100 may denote a support surface that supports the circuit board 50.

The battery pack may further include the circuit board 50 for controlling charging/discharging operations of the battery cells 10. The circuit board 50 obtains status information of the battery cells 10 and may control the charging/discharging operations of the battery cells 10 based on the status information. For example, the circuit board 50 may obtain status information, such as a temperature and a voltage of each battery cell 10, and may sense incorrect operations, such as over-charging, over-discharging, and over-heating, based on the status information to take protective measures, such as suspension of the charging/discharging operations of the battery cell 10. The circuit board 50 may be arranged on the external surface 101 of the cell holder 100. The circuit board 50 may obtain the status information from the battery cells 10, and may be connected to the battery cells 10 via a connection tab 150.

The connection tab 150 may include a first portion 151 extending upward to the external surface 101 of the cell holder 100 from the connection member 120 and a second portion 152 arranged on the external surface 101 of the cell holder 100, and may further include a bent portion 153 connecting the first and second portions 151 and 152 to each other. The first portion 151 may extend from the connection member 120 toward the first direction (e.g., the Z1-direction). For example, the first portion 151 may extend from the connection member 120 across the valley region "g" between the neighboring battery cells 10.

In an embodiment, the battery cell 10 may have a cylindrical shape, and the concave valley region "g" may be between the neighboring battery cells 10. Here, the first portion 151 may extend across the valley region "g" between the neighboring battery cells 10 to reduce a spatial height occupied by the connection tab 150.

The second portion 152 may extend from the first portion 151 in a different direction from the first direction 151, e.g., in a length direction of the battery cell 10, via the bent portion 153. When the first portion 151 extends across the valley region "g" between the neighboring battery cells 10, the second portion 152 may be located within the valley region "g." As described above, since the second portion 152 is located within the valley region "g" between the neighboring battery cells 10, fluctuation of the connection tab 150 may be prevented or substantially prevented with respect to external vibrations or shock, and the connection tab 150 may be protected.

The bent portion 153 of the connection tab 150 may be arranged within a battery area S. Here, the battery area S may denote a region occupied by a group of battery cells 10 electrically connected to one another. For example, the battery area S may denote a square region in the first and second directions (e.g., the Z1 and Z2-directions), which includes a region of the battery cells 10 electrically connected to one another via the connection member 120. Here, for example, the connection member 120 might electrically connect four different battery cells 10. In another embodiment, the battery area S may denote a rectangular region in the first and second directions Z1 and Z2, which includes a region of the battery cells 10 electrically connected to one another via the connection member 120. Here, for example, the connection member 120 might electrically connect six different battery cells 10. In another embodiment, the battery area S may denote a parallelogram, which includes a region of the battery cells 10 electrically connected to one another via the connection member 120. Here, for example, the one connection member 120 might electrically connect battery cells stacked in a staggered manner.

When the bent portion 153 of the connection tab 150 is arranged within the battery area S, the first portion 151 in front of the bent portion 153 may extend across the valley region "g" between the neighboring battery cells 10 and the second portion 152 behind the bent portion 153 may be located within the valley region "g" between the neighboring battery cells 10. This will be described in further detail later.

In an embodiment, the connection tab 150 may be directly connected to the circuit board 50. Here, the connection tab 150 being directly connected to the circuit board 50 denotes that an additional connection member, e.g., a flexible wire, is not arranged between the connection tab 150 and the circuit board 50 for mediating the electric connection.

In an embodiment, the connection tab 150 may further include a connection portion 155 that is directly connected to the circuit board 50. The connection portion 155 may be inserted to a connection hole 50' of the circuit board 50, and may be fixed to a connection pad (not shown) around the connection hole 50' via soldering.

The connection tab 150 may further include a lead portion 154 extending between the connection portion 155 and the second portion 152. The lead portion 154 may extend from the second portion 152 towards the connection hole 50' of the circuit board 50. A direction in which the lead portion 154 extends may be any of various directions depending on a design of the circuit board 50, such as, for example, according to an arrangement of the connection hole 50' of the circuit board 50. In one embodiment, the lead portion 154 may extend towards the connection hole 50' along a side direction of the circuit board 50.

In an embodiment, the lead portion 154 may extend along the second direction (e.g., the Z2-direction) towards the connection hole 50' of the circuit board 50 that is arranged above the battery cells 10. That is, the lead portion 154 may extend along a side direction of the circuit board 50, and at the same time, extend upward towards the circuit board 50 to have a diagonal line shape with an inclination angle.

In an embodiment, for example, the circuit board 50 may be formed having a rectangular shape including a pair of long side portions extending in the second direction (e.g., the Z2-direction) along a direction in which the battery cells 10 are arranged and a pair of short side portions between the pair of longer side portions. Here, the lead portion 154 may extend at an oblique angle of inclination that follows the direction of the long side portion (e.g., the second direction) and the upward direction (e.g., the first direction).

The battery cell 10 may be electrically connected to neighboring battery cells 10 via the connection member 120. In an embodiment, for example, the connection member 120 may electrically connect four battery cells 10 to one another, and the connection member 120 may connect the neighboring battery cells 10 in the first direction (e.g., a Z1-direction) in parallel while connecting the neighboring battery cells 10 in the second direction (e.g., a Z2-direction) in series. In an embodiment, the connection member 120 may connect the same polarities of the battery cells 10 that make a pair in the first direction (e.g., the Z1-direction) to connect the corresponding battery cells 10 in parallel, and may connect opposite polarities of the battery cells 10 that make a pair in the second direction (e.g., the Z2-direction) to connect the corresponding battery cells 10 in series.

By connecting the battery cells 10 in parallel in the first direction (e.g., the Z1-direction) and connecting the battery cells 10 in series in the second direction (e.g., the Z2-direction), a combined connection of the parallel-serial connections may be obtained. Accordingly, an output capacity of the battery pack may be increased or optimized to be high capacity and high output. In an embodiment, the battery cells 10 may be connected in parallel in the first direction (e.g., the Z1-direction) and may be connected in series in the second direction (e.g., the Z2-direction) by using one connection member 120, and, thus, the number of connection members 120 for connecting the neighboring battery cells 10 may be reduced.

In an embodiment, the first portion 151 of the connection tab 150 may extend in the first direction (e.g., the Z1-direction) that is the parallel connection direction. The first portion 151 of the connection tab 150 may extend in one of the parallel connection direction or the serial connection direction exclusively of the other. That is, according to one embodiment, since the first portion 151 of the connection tab 150 extends in the first direction (e.g., the Z1-direction) that is the parallel connection direction, the first portion 151 does not extend in the second direction (e.g., the Z2-direction) that is the serial connection direction.

Since the connection member 120 performs the serial connection and the parallel connection concurrently or simultaneously, the output capacity of the battery pack may be increased or optimized at high output and high capacity. In addition, the serial connection and the parallel connection may be performed at the same time by using one connection member 120 to reduce the number of the connection members 120. As described above, the parallel connection direction and the serial connection direction that are exclusive to each other may be defined with respect to one connection member 120, and, thus, the extension direction of the first portion 151 of the connection tab 150 may be set as one exclusive direction of the parallel connection direction and the serial connection direction.

The lead portion 154 of the connection tab 150 may extend in a diagonal direction that concurrently or simultaneously follows the first direction (e.g., the Z1-direction) that is the parallel connection direction and the second direction (e.g., the Z2-direction) that is the serial connection direction. The lead portion 154 of the connection tab 150 extends toward the connection hole 50' of the circuit board 50, and, as described above, since the parallel connection direction and the serial connection direction are exclusively defined with respect to one connection member 120, the extension direction of the lead portion 154 of the connection tab 150 may be set as the diagonal direction that is between or oblique to each of the parallel connection direction and the serial connection direction.

The circuit board 50 may form a circuit portion for controlling the charging/discharging operations of the battery cells 10. The circuit board 50 may receive status information of the battery cell 10, e.g., a voltage or a temperature of the battery cell 10, through the connection tab 150. In addition, the circuit board 50 may control the charging/discharging operations of the battery cell 10 based on the status information of the battery cell 10. The connection tab 150 is electrically and thermally connected to the battery cell 10 to share the voltage or the temperature information of the battery cell 10, and, thus, the circuit board 50 may receive the status information of the battery cell 10 through the connection tab 150.

The circuit board 50 includes the connection hole 50' for connecting to the connection tab 150. Although not shown in the drawings, a connection pad (not shown) may be provided around the connection hole 50', and the status information transmitted through the connection tab 150 may be transferred to a requesting part of the circuit board 50. In an embodiment, the connection portion 155 of the connection tab 150 may be directly inserted to the connection hole 50' of the circuit board 50. Also, in an embodiment, the connection portion 155 of the connection tab 150 and the connection pad (not shown) may be fixed to each other via soldering.

The circuit board 50 may be supported by the connection tab 150. In an embodiment, for example, the circuit board 50 is fixed on the external surface 101 of the cell holder 100, and may be supported by the connection tab 150 extending above the external surface 101 of the cell holder 100. For example, a plurality of connection tabs 150 may extend above the external surface 101 of the cell holder 100, and the circuit board 50 may be fixedly positioned on the external surface 101 of the cell holder 100 via the connection tabs 150 that are fixedly inserted to different connection holes 50' from one another. Here, shocks or vibrations applied to the circuit board 50 may be reduced through elastic support of the connection tabs 150, and the circuit board 50 may be elastically supported by the lead portion 154 that extends diagonally in each of the connection tabs 150.

In an embodiment, the connection members 120 may be arranged in alternating patterns at front and rear portions of the battery pack. In an embodiment, for example, one of the connection members 120 arranged at a front portion of the battery pack connects third and fourth battery cells 10 to each other in the second direction (e.g., the Z2-direction), and one of the connection members 120 arranged at a rear portion of the battery pack may not connect the third and fourth battery cells 10, but may connect second and third battery cells 10 to each other. As such, the plurality of battery cells 10 may be connected in series through the arrangement of the connection members 120 that alternate at the front and rear portions of the battery pack.

In an embodiment, the battery cells 10 in a first row and a second row are connected to one another in parallel along the first direction (e.g., the Z1-direction) that is the parallel connection direction, and neighboring battery cells 10 along the second direction (e.g., the Z2-direction) may be connected to one another in series because the connection tabs 120 are arranged alternately with each other along the second direction (e.g., the Z2-direction) that is the serial connection direction.

The connection tab 150 may extend from the connection member 120 and, in an embodiment, may be integrally formed with the connection member 120. For example, the connection tab 150 may include a metal plate integrally formed with the connection member 120. The connection tab 150 may transfer voltage information of the battery cell 120 to the circuit board 50. For example, the circuit board 50 may perform a balancing operation based on the voltage information of the battery cell 10 transferred through the connection tab 150. The connection tab 150 may have a narrow or minimum width provided that the voltage information of the battery cell 10 may be transferred, and such that the width of the connection tab 150 may not break due to Joule heat. In an embodiment, for example, the connection tab 150 may have a width of 2 mm.

The connection tab 150 may include the first portion 151 extending from the connection member 120 toward the external surface 101 of the cell holder 100 in the first direction (e.g., the Z1-direction), and the second portion 152 extending from the first portion 151 to be arranged on the external surface 101 of the cell holder 100. In addition, the connection tab 150 may include the bent portion 153 through which the direction is changed between the first and second portions 151 and 152.

The bent portion 153 denotes a bent portion of the connection tab 150, and when the connection tab 150 has a plurality of bent portions, for example, the bent portion 153 may correspond to a bent portion that is the closest to the battery cell 10. As will be described later, the bent portion 153 may be located in the battery area S.

Referring to FIGS. 5 and 6, the bent portion 153 of the connection tab 150 may be arranged within the battery area S. Here, the battery area S may denote a region occupied by a group of battery cells 10 electrically connected to one another. In an embodiment, the battery area S may correspond to a square area that includes areas of the plurality of battery cells 10 connected by one of the connection members 120 in the first and second directions (e.g., the Z1 and Z2-directions).

In an embodiment, the bent portion 153 of the connection tab 150 being arranged within the battery area S denotes that the bent portion 153 of the connection tab 150 is arranged within the battery area S without protruding from the battery area S, and, as a result, the battery pack of a compact type may be manufactured.

The connection tab 150 protrudes upward from the connection member 120 in the first direction (e.g., the Z1-direction) to extend over the external surface 101 of the cell holder 100. Here, the connection tab 150 may protrude upward to the external surface 101 up to the bent portion 153 (corresponding to the first portion 151) and may extend in parallel with the external surface 101 of the cell holder 100 after the bent portion 153 (corresponding to the second portion 152). The bent portion 153 of the connection tab 150 may provide criteria with respect to a spatial height occupied by the connection tab 150, and if the bent portion 153 were outside of the battery area S, the spatial height occupied by the connection tab 150 would be increased, and then a dead space would be increased and not suitable for the compact structure.

The bent portion 153 of the connection tab 150 may be arranged within the battery area S. In an embodiment, the connection tab 150 (in particular, the first portion 151 of the connection tab 150) may extend across the valley region "g" between the neighboring battery cells 10, and the bent portion 153 of the connection tab 150 may be provided at a height that is the same or lower than that of a peak point PE of the surface (e.g., the cylindrical surface) of the battery cell. That is, since the connection tab 150 (in particular, the first portion 151 of the connection tab 150) extends across the valley region "g" of the neighboring battery cells 10, the bent portion 153 of the connection tab 150 may be formed at a low height where the bent portion 153 does not protrude beyond the peak point PE of the surface (e.g., the cylindrical surface) of the battery cell 10.

The bent portion 153 of the connection tab 150 being arranged within the battery area S denotes that the first portion 151 of the connection tab 150 is relatively short, that is, a signal transmission path of the connection tab 150 is reduced to provide a low-resistive design, and, thus, the status information of the battery cell 10 may be transferred with high accuracy.

When the first portion 151 of the connection tab 150 extends across the valley region "g" between the neighboring battery cells 10, the second portion 152 of the connection tab 150 past the bent portion 153 may be arranged within the valley region "g" between the neighboring battery cells 10. When the connection tab 150 is arranged in the valley region "g" between the neighboring cells 10, the connection tab 150 may be fixedly positioned. That is, the connection tab 150 may not interfere with other components in the valley region "g" and may be firmly supported even when there are external shocks or vibrations.

Referring to FIG. 6, in an embodiment, the connection member 120 may be coupled to the battery cells 10 via welding. For example, the connection member 120 may include first and second welding portions P1 and P2 corresponding to each battery cell 10, and a cut portion C crossing between the first and second welding portions P1 and P2. Although not shown in the drawings, the connection member 120 and the battery cell 10 may be welded to each other by a welding current applied from two welding electrodes (not shown) having different polarities, and, then, the first and second welding portions P1 and P2 that are different from each other may be formed in the connection member 120. Here, the cut portion C may be formed between the first and second welding portions P1 and P2. The cut portion C may prevent or substantially prevent leakage current, e.g., the welding current applied to the first and second welding portions P1 and P2 from flowing along the surface of the connection member 120, not along bonded surfaces between the connection member 120 and the battery cell 10. The cut portion C increases a path connecting between the first and second welding portions P1 and P2 so as to prevent or substantially prevent the first and second welding portions P1 and P2 from directly connecting to each other via the surface of the connection member 120.

According to one or more embodiments, the space occupied by the connection tab that mediates the electric connection between the battery cells and the circuit board may be reduced so as to form a compact structure of the battery pack. In addition, the signal transmission path through the connection tab is reduced to provide the low-resistive structure. The space occupied by the connection tab may be reduced by utilizing the valley region between the neighboring battery cells, and at the same time, the connection tab is arranged in the valley region so as not to interfere with other components, and the connection tab may be firmly supported even when there are external shocks or vibrations applied to the battery pack.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope as defined by the following claims.

What is claimed is:

1. A battery pack comprising:
   at least two battery cells;
   a circuit board to control charging and discharging operations of the battery cells;
   a connection member electrically connecting neighboring battery cells of the at least two battery cells to each other; and
   a connection tab electrically connected to the battery cells, the connection tab comprising a first portion extending in a first direction from the connection member towards the circuit board, a bent portion proximal to the battery cells and located within a battery area defined by the battery cells, a second portion extending in a length direction of the battery cells via the bent portion, the length direction of the battery cells being different from the first direction, a connection portion connected to the circuit board, and a lead portion extending between the second portion and the connection portion, wherein the bent portion does not protrude in the first direction beyond a peak point of the battery cells, wherein the first portion of the connection tab extends across a valley region between the neighboring battery cells, and the second portion of the connection tab is located within the valley region, and wherein the lead portion extends diagonally with an inclination angle so as to concurrently follow the first direction and a second direction that is different from the first direction.

2. The battery pack of claim 1, wherein the battery area is a square area including a plurality of battery cell regions connected by the connection member.

3. The battery pack of claim 1, wherein the connection member connects the neighboring battery cells in the first direction in parallel, and connects the neighboring battery cells in the second direction that is different from the first direction in series.

4. The battery pack of claim 1, wherein the connection tab comprises a metal plate formed as an integral body.

5. The battery pack of claim 4, wherein the metal plate is integrally formed with the connection member.

6. The battery pack of claim 1, wherein the connection portion is directly connected to the circuit board.

7. The battery pack of claim 6, wherein the circuit board comprises a connection hole to which the connection portion is inserted.

8. The battery pack of claim 1, wherein the circuit board is located above the battery cells in the first direction.

9. The battery pack of claim 1, wherein the connection member comprises:
   a first welding portion and a second welding portion with respect to the battery cells; and
   a cut portion crossing between the first welding portion and the second welding portion.

10. The battery pack of claim 1, further comprising a cell holder configured to accommodate the battery cells, wherein an internal surface of the cell holder surrounds the battery cells, and the circuit board is arranged above an external surface of the cell holder.

11. The battery pack of claim 1, wherein the second direction is different from the length direction of the battery cells.

* * * * *